(12) United States Patent
Kim (10) Patent No.: US 9,830,437 B2
(45) Date of Patent: Nov. 28, 2017

(54) AUTOMATIC LOG-IN FUNCTION CONTROL (71) Applicant: Empire Technology Development LLC, Wilmington (DE)

(72) Inventor: Seungil Kim, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 255 days.

(21) Appl. No.: 14/377,410

(22) PCT Filed: Aug. 8, 2013

(86) PCT No.: PCT/US2013/054123
§ 371 (c)(1),
(2) Date: Aug. 7, 2014

(87) PCT Pub. No.: WO2015/020658
PCT Pub. Date: Feb. 12, 2015

(65) Prior Publication Data
US 2016/0188854 A1    Jun. 30, 2016

(51) Int. Cl.
H04L 29/06    (2006.01)
G06F 21/00    (2013.01)
G06F 21/31    (2013.01)

(52) U.S. Cl.
CPC ............ *G06F 21/316* (2013.01); *G06F 21/31* (2013.01)

(58) Field of Classification Search
CPC .................................................... G06F 21/316
See application file for complete search history.

(56) References Cited

U.S. PATENT DOCUMENTS

| 8,607,306 | B1* | 12/2013 | Bridge ............... H04L 63/068 |
| | | | 726/1 |
| 2004/0111620 | A1 | 6/2004 | Saunders et al. |
| 2006/0136972 | A1* | 6/2006 | Metzger ........... G08B 13/19689 |
| | | | 725/105 |
| 2008/0282091 | A1 | 11/2008 | Ashok et al. |
| 2008/0288405 | A1 | 11/2008 | John |
| 2009/0150991 | A1 | 6/2009 | Hoey et al. |
| 2009/0172788 | A1 | 7/2009 | Vedula et al. |

(Continued)

FOREIGN PATENT DOCUMENTS

| EP | 2021968 B1 | 11/2012 |
| WO | 2012100615 A1 | 8/2012 |

OTHER PUBLICATIONS

International Search Report and Written Opinion for International Application No. PCT/US13/54123, dated Mar. 3, 2014.

*Primary Examiner* — Lisa Lewis
(74) *Attorney, Agent, or Firm* — Brundidge & Stanger, P.C.

(57) ABSTRACT

Technologies are generally described for an automatic log-in function control scheme. In some examples, a method performed under control of an end device may include detecting, from the end device, input of one or more passcodes to access the end device; determining that a user of the end device is not an authorized user based at least in part on a detected behavioral pattern in connection with the input of the one or more passcodes; and disabling an automatic log-in function of at least one application that is hosted on the end device.

14 Claims, 7 Drawing Sheets

(56) References Cited

U.S. PATENT DOCUMENTS

| | | |
|---|---|---|
| 2009/0235083 A1 | 9/2009 | Bleahen |
| 2009/0307062 A1 | 12/2009 | Lutnick |
| 2009/0328169 A1 | 12/2009 | Hutchison |
| 2010/0050268 A1 | 2/2010 | Sheymov |
| 2010/0174758 A1 | 7/2010 | Radenkovic et al. |
| 2010/0313248 A1 | 12/2010 | Krivosheev et al. |
| 2011/0141276 A1 | 6/2011 | Borghei |
| 2012/0021724 A1 | 1/2012 | Olsen et al. |
| 2012/0042364 A1 | 2/2012 | Hebert |
| 2012/0110668 A1 | 5/2012 | Schechter et al. |
| 2012/0210408 A1 | 8/2012 | Lu et al. |
| 2012/0331536 A1 | 12/2012 | Chabbewal et al. |
| 2013/0073672 A1 | 3/2013 | Ayed |
| 2013/0091564 A1 | 4/2013 | Fitzgerald et al. |
| 2013/0120109 A1 | 5/2013 | Libin et al. |
| 2013/0191908 A1 | 7/2013 | Klein |
| 2013/0198834 A1 | 8/2013 | Kirsch |
| 2013/0295882 A1 | 11/2013 | Zhao |
| 2015/0143528 A1* | 5/2015 | Johansson ........... H04L 63/1433 726/25 |

* cited by examiner

FIG. 7

AUTOMATIC LOG-IN FUNCTION CONTROL

CROSS-REFERENCE TO RELATED APPLICATION

This Application is the U.S. National Stage filing under 35 U.S.C. §371 of International Application No. PCT/US2013/054123 filed on Aug. 8, 2013. The disclosure of the International Application is hereby incorporated herein by reference in its entirety.

BACKGROUND

Generally, cloud computing refers to accessing at least one of multiple server-based computational resources using a network, such as the Internet, for the purposes of data retrieval, data processing or data storage. For cloud computing services, applications may be provided and managed by a cloud server, and associated data may be stored remotely in a cloud database. Users may be provided with cloud computing services through their own mobile devices, such as a smartphone.

SUMMARY

In an example, a method performed under control of an end device may include detecting, from the end device, input of one or more passcodes to access the end device; determining that a user of the end device is not an authorized user based at least in part on a detected behavioral pattern in connection with the input of the one or more passcodes; and disabling an automatic log-in function of at least one application that is hosted on the end device.

In another example, an end device may include a processor; an internal memory; an input unit configured to detect, from the end device, input of one or more passcodes to access the end device; and an operating system, stored in the internal memory, that, in response to execution, causes the processor to perform operations including: determining that a user of the end device is not an authorized user based at least in part on a detected behavioral pattern in connection with the input of the one or more passcodes; and controlling disability of an automatic log-in function of at least one application that is hosted on the end device.

In yet another example, a computer-readable storage medium may store thereon computer-executable instructions that, in response to execution, cause an operating system that is stored in an end device to perform operations including detecting, from the end device, input of one or more passcodes to access the end device; determining that a user of the end device is not an authorized user based at least in part on a detected behavioral pattern in connection with the input of the one or more passcodes; and disabling an automatic log-in function of at least one application that is hosted on the end device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to schemes for controlling an automatic log-in function for at least one application. Technologies are generally described for disabling an automatic log-in function for at least one application that is hosted on an end device when a current user is not an authorized user of the end device.

In some examples, a user may attempt to access an end device that is in a locked state. By way of example, the user may enter one or more passcodes and/or password gesture patterns on a touchscreen. If the passcodes and/or password gesture patterns do not correspond to a currently-valid passcode and/or password gesture pattern which is stored in a memory of the end device, the end device remains locked and the user is not able to access the end device. Meanwhile, the end device may store the one or more entered invalid passcodes or password gesture patterns in the memory.

If the user gets permission to access to the end device by chance (e.g., the user enters the currently-valid passcode and/or password gesture pattern by chance) after at least a threshold number of inputs of invalid passcodes or password gesture patterns, the end device may match at least some of the invalid passcodes and/or password gesture patterns to those stored in memory, prior to the user gaining access to the end device. Thus, the end device may then determine that the user is not an authorized user of the end device based on the matched invalid passcodes and/or password gesture patterns. By way of example, if the matched invalid passcodes are randomly generated or if the matched invalid passcodes are similar to the currently-valid passcode or the same as a previously-used passcode, the end device may determine that the user is not an authorized user of the end device.

Then, the end device may disable an automatic log-in function for at least one application that is hosted on the end device when the user is determined to be not an authorized user.

Figure 1:
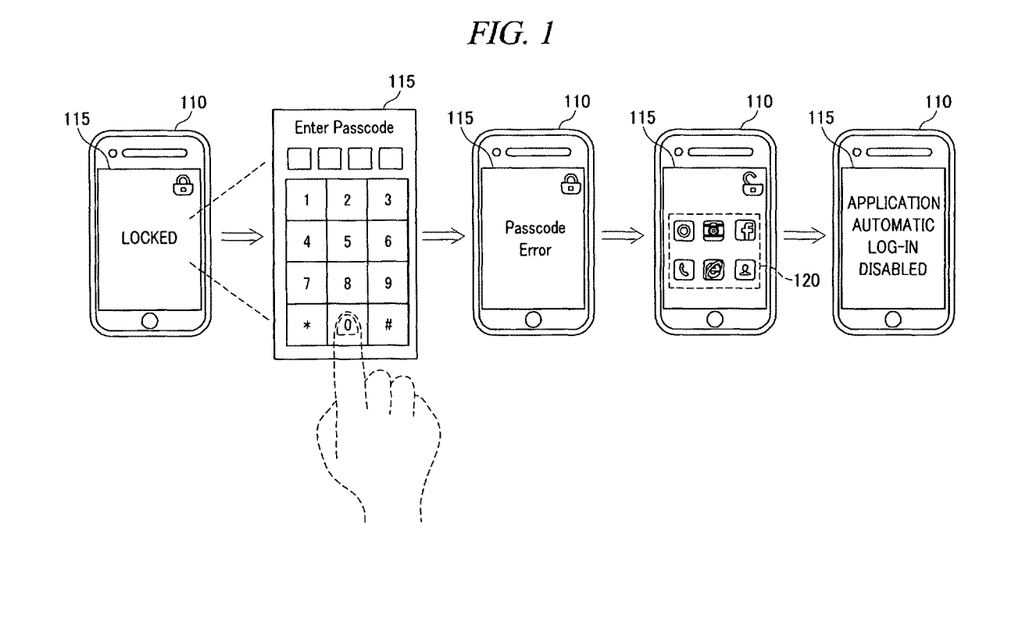
FIG. 1 schematically shows an illustrative example of an end device for implementing an automatic log-in function control scheme, arranged in accordance with at least some embodiments described herein.

FIG. 1 schematically shows an illustrative example of an end device for implementing an automatic log-in function control scheme, arranged in accordance with at least some embodiments described herein. As depicted in FIG. 1, an end device 110 may be in a locked state, as indicated on a touch screen 115 which is operatively coupled to end device 110. End device 110 may be any type of electronic device configured to store, retrieve, compute, transmit and/or receive data, including, for example, a smartphone, a mobile phone, a personal digital assistant (PDA), a tablet, a laptop computer, etc.

In some embodiments, at least one application (for example, at least one application of an application group 120) may be hosted and operated on end device 110. Alternatively, end device 110 may be communicatively connected to a cloud system (not illustrated in FIG. 1) via a network so that the at least one application (for example, at least one application of application group 120) may be operated on end device 110 by the cloud system. By way of example, but not limitation, the network between end device 110 and the cloud system may include all kinds of wireless networks, non-limiting examples of which may include a mobile radio communication network, a satellite network, a bluetooth, WiBro (Wireless Broadband Internet), Mobile WiMAX, HSDPA (High Speed Downlink Packet Access) or the like. The cloud system may refer to a cloud server or a cloud configuration that provides some type of communications, data storage, data or information processing, or any combination thereof.

In some embodiments, a user or person who currently possesses end device 110 may try to access end device 110, which is in a locked state. By way of example, but not limitation, as depicted in FIG. 1, the user may enter one or more passcodes to access end device 110. Alternatively, the user may enter one or more password gesture patterns to access end device 110. In yet another examples, biometric technologies, such as a facial recognition technology or an iris recognition technology, may be used instead of the passcodes. Further, any other user verification means, which will be available according to the technology development, may be used instead of the passcodes.

If the one or more passcodes and/or password gesture patterns that are input by the user do not correspond to a currently-valid passcode, which is pre-registered and stored in a memory of end device 110, end device 110 will not allow the user to access end device 110.

Further, end device 110 may be configured to store the one or more passcodes and/or password gesture patterns that were input by the user in memory. If the user inputs multiple sets of passcodes and/or password gesture patterns continuously or intermittently, end device 110 may be configured to store the multiple sets of passcodes and/or password gesture patterns in memory.

Even with the user inputting the one or more invalid passcodes and/or password gesture patterns, there still remains a chance that the user may coincidentally enter the currently-valid passcode. Then, as depicted in FIG. 1, end device 110 may be unlocked, as depicted on touch screen 115 by displaying one or more active application icons thereon. End device 110 may be configured to detect the input of one or more passcodes and/or password gesture patterns that may be stored in the memory of end device 110. Thus, end device 110 may be configured to match the previously entered passcodes and/or password gesture patterns that were input prior to the user entering the currently-valid passcode with those that are previously stored.

Based on the aforementioned matching, end device 110 may be further configured to determine whether the user of end device 110 is an authorized user or not by, at least in part, determining a behavioral pattern in connection with the input of one or more passcodes and/or password gesture patterns. According to some embodiments, end device 110 may be configured to compare the detected one or more passcodes and/or password gesture patterns with the currently-valid passcode and/or password gesture patterns. End device 110 may be configured to then determine that the user of end device 110 is not an authorized user of end device 110 when the one or more passcodes and/or password gesture patterns are determined to be randomly generated. By way of example, but not limitation, if all of digits included in the previously input passcodes are different from one input passcode to the next, end device 110 may determine that the input passcodes, which were input prior to entry of the currently-valid passcode, were randomly generated. Thus, access to one or more of the applications may be at least temporarily denied.

Further, in some embodiments, end device 110 may be configured to recognize both a trace (e.g., at least one of direction or length) of the detected one or more password gesture patterns and a trace of the currently-valid password gesture patterns. By way of example, but not limitation, end device 110 may recognize the traces by using any of multiple touch sensitivity technologies, including capacitive, resistive, infrared, and surface acoustic wave technologies, as well as other proximity sensor arrays or other elements for determining one or more points of contact with the touch screen. End device 110 may be further configured to calculate a similarity between the trace of the detected one or more password gesture patterns and the trace of the currently-valid password gesture patterns. End device 110 may compare the similarity with a predetermined value stored in memory and if the similarity is lower than the predetermined value, end device 110 may determine that the input password gesture patterns, which were input prior to entry of the currently-valid password gesture patterns, were randomly generated. The predetermined value may be a default value or a variable value set according to security requirement for end device 110.

According to some other embodiments, end device 110 may be configured to compare the detected one or more passcodes and/or password gesture patterns with the currently-valid passcode and/or password gesture patterns. End device 110 may be configured to then determine that the user of end device 110 is not an authorized user of end device 110 when the one or more passcodes and/or password gesture patterns are determined to be similar but not identical to the currently-valid passcodes and/or password gesture patterns. By way of example, if a part (e.g., one or two numbers) of the digits included in the previously input passcodes is different from digits included in the currently-valid passcodes, end device 110 may determine that the input passcodes, which were input prior to entry of the currently-valid passcode, are similar to the currently-valid passcodes. Thus, access to one or more of the applications may be at least temporarily denied.

In some other embodiments, end device 110 may be configured to determine that the user of end device 110 is not an authorized user when the one or more passcodes and/or password gesture patterns are determined to be the same as a previously-valid passcode or password gesture pattern. By way of example, but not limitation, if a valid passcode and/or password gesture pattern for accessing end device 110 has been changed, the previously valid passcode and/or password gesture pattern may be stored in a memory of end device 110. Accordingly, end device 110 may be configured to compare the detected passcodes and/or password gesture patterns with the stored previously-valid passcodes and/or password gesture patterns. Positive comparisons may result in a determination that the user of end device 110 is not an authorized user if the detected passcodes and/or password gesture patterns are the same as the previously-valid passcodes and/or password gesture patterns.

Further, end device 110, e.g., an operating system thereof, may be configured to disable an automatic log-in function of the at least one application that is hosted on and/or stored on end device 110 when the user of end device 110 is determined to be an unauthorized user. In some embodiments, if the at least one application is activated on end device 110, end device 110 may be configured to transmit, to the at least one application, an instruction to disable the automatic log-in function for the at least one application. The instruction may be transmitted from end device 110 to the application based at least in part on a predefined protocol between the at least one application and an operating system of end device 110. The instruction may indicate that the user of end device 110 is not an authorized user. The application may be configured to disable the automatic log-in function in response to receipt of the instruction.

Figure 2:
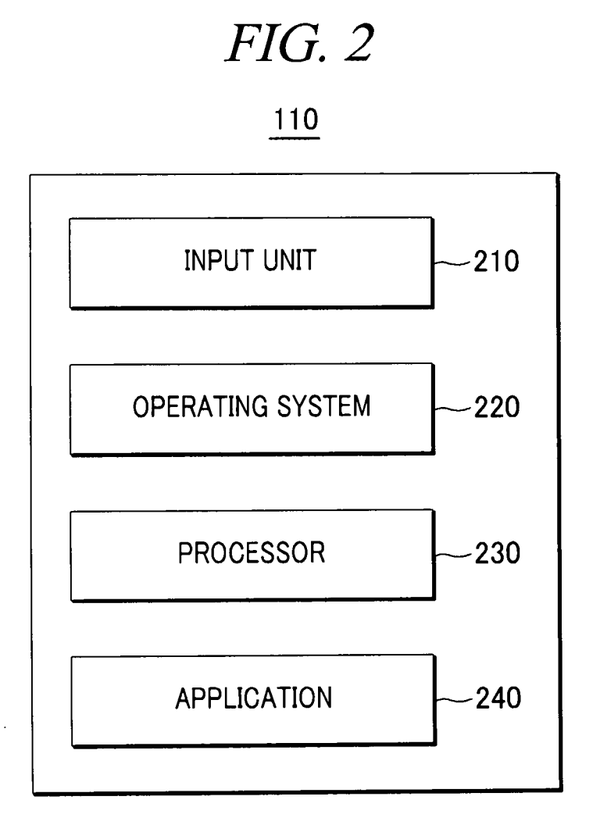
FIG. 2 shows a schematic block diagram illustrating an example architecture of an end device for implementing an automatic log-in function control scheme, arranged in accordance with at least some embodiments described herein.

FIG. 2 shows a schematic block diagram illustrating an example architecture of end device 110 for implementing an automatic log-in function control scheme, arranged in accordance with at least some embodiments described herein. As depicted in FIG. 2, end device 110 may include an input unit 210, an operating system 220, a processor 230 and an application 240. Operating system 220 and application 240 may be stored in an internal memory of end device 110 or a memory which is operatively connected to end device 110. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof.

Input unit 210 may be configured to detect an input of one or more passcodes and/or password gesture patterns, to end device 110. In some embodiments, if a user of end device 110 enters passcodes and/or password gesture patterns, end device 110 may store the passcodes and/or password gesture patterns in an internal memory of end device 110 or a memory which is operatively connected to end device 110. Further, when the user enters a currently-valid passcode and/or password gesture pattern to access end device 110 and end device 110 becomes unlocked, end device 110 may be configured to detect, from the memory of end device 110, the passcodes and/or password gesture patterns that were input by the user before the user entered the currently-valid passcode and/or password gesture pattern.

Operating system 220 may be configured to manipulate processor 230 to implement the automatic log-in function control scheme as described herein. Application 240 may be hosted and operated on end device 110. Alternatively, application 240 may be operated on end device 110 by a cloud system that is communicatively connected to end device 110.

Figure 3:
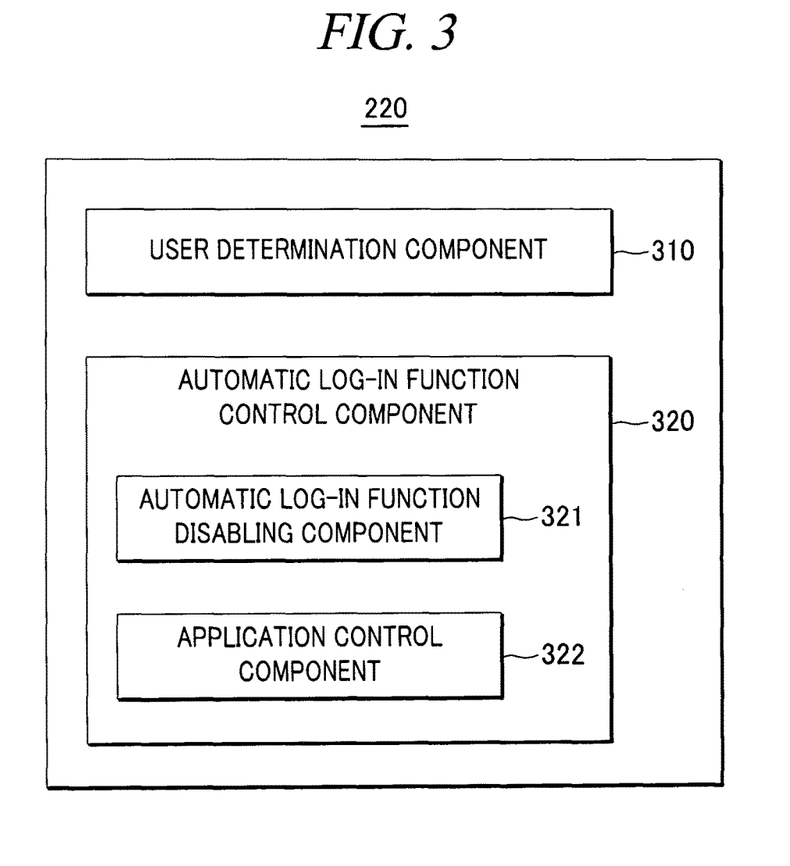
FIG. 3 shows a schematic block diagram illustrating an example architecture of an operating system for implementing an automatic log-in function control scheme, arranged in accordance with at least some embodiments described herein.

FIG. 3 shows a schematic block diagram illustrating an example architecture of operating system 220 for implementing an automatic log-in function control scheme, arranged in accordance with at least some embodiments described herein. As depicted in FIG. 3, operating system 220 may include a user determination component 310 and an automatic log-in function control component 320. Further, automatic log-in function control component 320 may include an automatic log-in function disabling component 321 and an application control component 322. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof.

User determination component 310 may be configured to determine that even a user who is able to access end device 110 may not be an authorized user, based at least in part on a detected behavioral pattern in connection with the input of the one or more passcodes and/or password gesture patterns that were entered by the user prior to entering a currently-valid passcode and/or password gesture pattern. User determination component 310 may be configured to compare the detected one or more passcodes and/or password gesture patterns with the currently-valid passcode and/or password gesture pattern. User determination component 310 may be configured to determine that the user of end device 110 is not an authorized user when the one or more passcodes and/or password gesture patterns are detected to be randomly generated, upon comparing. According to some embodiments, user determination component 310 may be configured to determine that the user of end device 110 is not an authorized user of end device 110 when the one or more passcodes and/or password gesture patterns that were entered by the user prior to entering the currently-valid passcode and/or password gesture pattern are determined to be randomly generated. By way of example, but not limitation, if all of digits included in the previously input passcodes are different from digits included in the currently-valid passcodes, user determination component 310 may determine that the input passcodes, which were input prior to entry of the currently-valid passcode, were randomly generated.

According to some other embodiments, user determination component 310 may be configured to then determine that the user of end device 110 is not an authorized user of end device 110 when the one or more passcodes and/or password gesture patterns are determined to be similar to the currently-valid passcodes and/or password gesture patterns. By way of example, if a part (e.g., one or two numbers) of the digits included in the previously input passcodes is different from digits included in the currently-valid passcodes, end device 110 may determine that the input passcodes, which were input prior to entry of the currently-valid passcode, are similar to the currently-valid passcodes.

In some other embodiments, user determination component 310 may be configured to determine that the user of end device 110 is not an authorized user when the one or more passcodes and/or password gesture patterns are determined to be the same as a previously-valid passcode or password gesture pattern. By way of example, but not limitation, if a valid passcode and/or password gesture pattern for accessing end device 110 has been changed, the previously valid passcode and/or password gesture pattern may be stored in a memory of end device 110. Accordingly, user determination component 310 may be configured to compare the detected passcodes and/or password gesture patterns with the stored previously-valid passcodes and/or password gesture patterns. Positive comparisons may result in a determination that the user of end device 110 is not an authorized user if the detected passcodes and/or password gesture patterns are the same as the previously-valid passcodes and/or password gesture patterns.

In some embodiments, automatic log-in function control component 320 may be configured to control disability of an automatic log-in function of application 240 when the user of end device 110 is determined to be an unauthorized user. Automatic log-in function disabling component 321 may be configured to disable the automatic log-in function for application 240 when the user of end device 110 is determined to be an unauthorized user. Application control component 322 may be configured to transmit, to application 240, via a predefined protocol between application 240 and operating system 220, an instruction to disable the automatic log-in function for application 240. By way of example, but not limitation, if application 240 is activated on end device 110, application control component 322 may be configured to transmit, to application 240, the instruction indicating that the user of end device 110 is not an authorized user. Then, application 240 may be configured to disable the automatic log-in function in response to receipt of the instruction.

Figure 4:
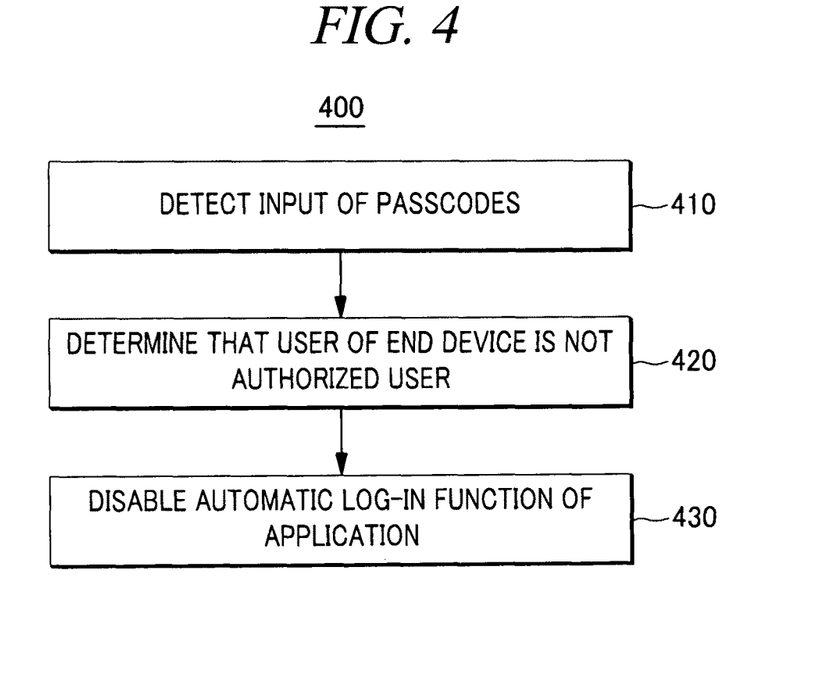
FIG. 4 shows an example flow diagram of a process for an end device for implementing an automatic log-in function control scheme, arranged in accordance with at least some embodiments described herein.

FIG. 4 shows an example flow diagram of a process 400 for end device 110 for implementing an automatic log-in function control scheme, arranged in accordance with at least some embodiments described herein. Process 400 may be implemented in or by end device 110 including input unit 210, operating system 220, processor 230 and application 240, as illustrated in FIG. 2. Process 400 may also be implemented by operating system 220 stored in end device 110.

Process 400 may include one or more operations, actions, or functions as illustrated by one or more blocks 410, 420 and/or 430. Although illustrated as discrete blocks, various blocks may be divided into additional blocks, combined into fewer blocks, or eliminated, depending on the desired implementation. Processing may begin at block 410.

At block 410 (Detect Input of Passcodes), end device 110 may be configured to detect an input of one or more passcodes and/or password gesture patterns. In some embodiments, if a user of end device 110 enters multiple passcodes and/or password gesture patterns, end device 110 may store the passcodes and/or password gesture patterns in an internal memory of end device 110 or a memory that is operatively connected to end device 110. Further, when the user enters a currently-valid passcode and/or password gesture pattern to access end device 110 so as to unlock end device 110, end device 110 may still be configured to compare the passcodes and/or password gesture patterns that were input by the user before the user entered the currently-used passcode with those stored in memory. Processing may proceed from block 410 to block 420.

At block 420 (Determine that User of End Device is not Authorized User), end device 110 and/or operating system 220 may determine that even a user who accesses end device 110 may not an authorized user, based at least in part on a detected behavioral pattern in connection with the input of the one or more passcodes and/or password gesture patterns detected at block 410. At block 420, end device 110 and/or operating system 220 may compare the detected one or more passcodes and/or password gesture patterns with the currently-valid passcodes and determine that the user is not an authorized user according to the comparing result. Processing may proceed from block 420 to block 430.

At block 430 (Disable Automatic Log-in Function of Application), end device 110 and/or operating system 220 may disable an automatic log-in function of at least one application hosted on end device 110 when the user of end device 110 is determined to be an unauthorized user at block 420.

In some embodiments, end device 110 and/or operating system 220, itself, may be configured to disable the automatic log-in function for the at least one application. In some embodiments, end device 110 and/or operating system 220 may transmit, to the at least one application via a predefined protocol between the at least one application and end device 110 and/or operating system 220, an instruction to disable the automatic log-in function. By way of example, but not limitation, if the at least one application is activated on end device 110, end device 110 may transmit, to the at least one application, the instruction indicating that the user of end device 110 is not an authorized user. Then, the at least one application may disable the automatic log-in function in response to receipt of the instruction.

Figure 5:
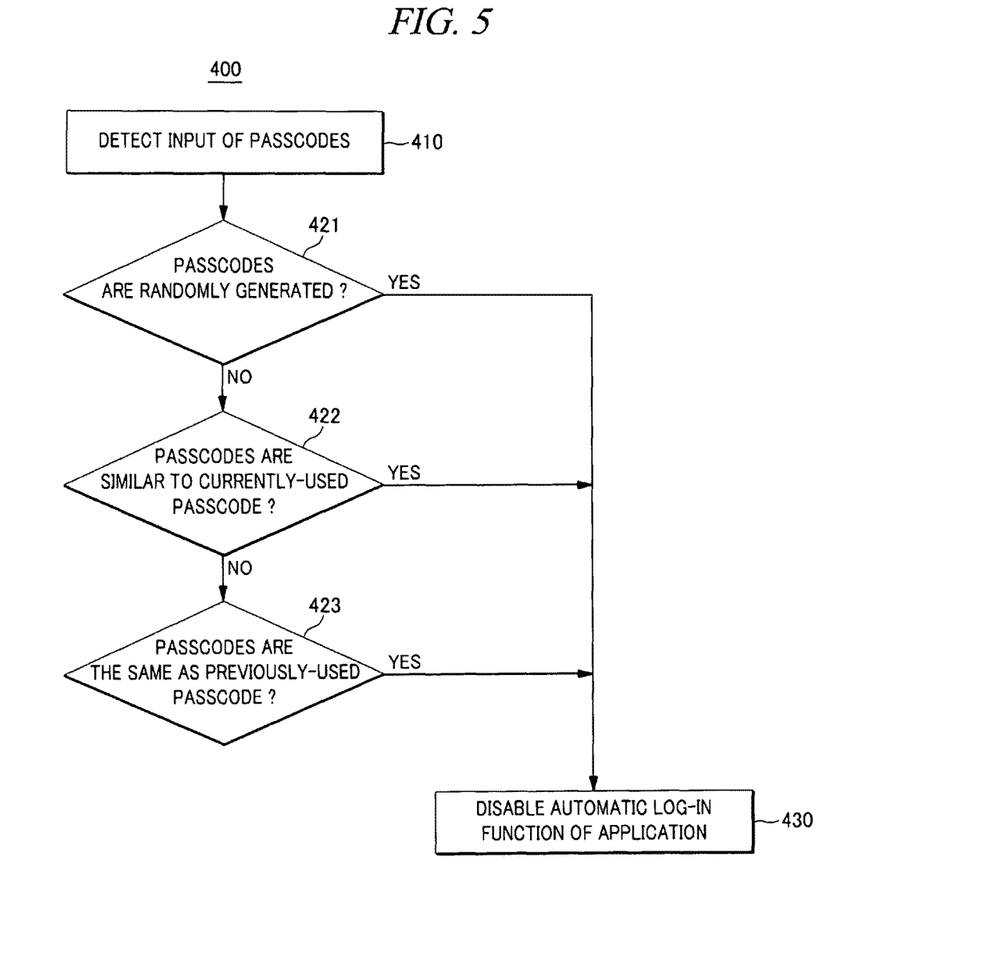
FIG. 5 shows a specific example flow diagram of a sub-process for an end device for implementing an automatic log-in function control scheme, arranged in accordance with at least some embodiments described herein.

FIG. 5 shows a specific example flow diagram of a sub-process 400 for an end device 110 for implementing an automatic log-in function control scheme, arranged in accordance with at least some embodiments described herein. Process 400 may include one or more operations, actions, or functions as illustrated by one or more blocks 410, 421, 422, 423 and/or 430. Although illustrated as discrete blocks, various blocks may be divided into additional blocks, combined into fewer blocks, or eliminated, depending on the desired implementation. Processing may begin at block 410.

At block 410 (Detect Input of Passcodes), end device 110 may be configured to detect an input of one or more passcodes and/or password gesture patterns. In some embodiments, if a user of end device 110 enters passcodes and/or password gesture patterns, end device 110 may store the passcodes and/or password gesture patterns in an internal memory of end device 110 or a memory which is operatively connected to end device 110. Further, when the user enters a currently-valid passcode and/or password gesture pattern to unlock end device 110, end device 110 may be configured to compare the passcodes and/or password gesture patterns that are input by the user before the user entered the currently-used passcode with those stored in memory. Processing may proceed from block 410 to block 421.

At block 421 (Determine that Detected Passcodes are Randomly Generated), end device 110 may compare the one or more passcodes and/or password gesture patterns detected at block 410 with a currently-valid passcode and/or password gesture pattern stored in a memory. End device 110 may determine whether the detected one or more passcodes and/or password gesture patterns are randomly generated, upon comparing. End device 110 may determine that the user of end device 110 is not an authorized user of end device 110 when the one or more passcodes and/or password gesture patterns that were entered by the user prior to entering the currently-valid passcode and/or password gesture pattern are determined to be randomly generated. By way of example, but not limitation, if all of digits included in the previously input passcodes are different from digits included in the currently-valid passcode, end device 110 may determine that the input passcodes, which were input prior to entry of the currently-valid passcode, were randomly generated. So, the user may be determined to be an unauthorized user of end device 110. If end device 110 determines, at block 421, that the detected passcodes and/or password gesture patterns are randomly generated, processing may proceed to block 430, while if end device 110 determines that the detected passcodes and/or password gesture patterns are not randomly generated, processing may proceed to block 422.

At block 422 (Determine that Detected Passcodes are Similar to Currently-used Passcodes), end device 110 may compare the one or more passcodes and/or password gesture patterns detected at block 410 with the currently-used passcode stored in the memory. End device 110 may determine whether the detected one or more passcodes and/or password gesture patterns are similar to the currently-used passcodes, upon comparing. End device 110 may determine that the user of end device 110 is not an authorized user of end device 110 when the one or more passcodes and/or password gesture patterns are determined to be similar to the currently-valid passcodes and/or password gesture patterns. By way of example, if a part (e.g., one or two numbers) of the digits included in the previously input passcodes is different from digits included in the currently-valid passcode, end device 110 may determine that the input passcodes, which were input prior to entry of the currently-valid passcodes, are similar to the currently-valid passcodes. So, the user may be determined to be an unauthorized user of end device 110. If end device 110 determines, at block 422, that the detected passcodes and/or password gesture patterns are similar to the currently-used passcode, processing may proceed to block 430, while if end device 110 determines that the detected passcodes and/or password gesture patterns are not similar to the currently-used passcodes, processing may proceed to block 423.

At block 423 (Determine that Detected Passcodes are the Same as Previously-used Passcodes), end device 110 may compare the one or more passcodes detected and/or password gesture patterns at block 410 with previously-used passcodes that are stored in the memory. End device 110 may determine that the user of end device 110 is not an authorized user when the one or more passcodes and/or password gesture patterns are determined to be the same as a previously-valid passcode or password gesture pattern. By way of example, but not limitation, if a valid passcode and/or password gesture pattern for accessing end device 110 has been changed, the previously valid passcode and/or password gesture pattern may be stored in a memory of end device 110. Accordingly, end device 110 may compare the detected passcodes and/or password gesture patterns with the stored previously-valid passcodes and/or password gesture patterns. Positive comparisons may result in a determination that the user of end device 110 is not an authorized user if the passcodes and/or password gesture patterns detected at block 410 are the same as the previously-valid passcodes and/or password gesture patterns. If end device 110 determines, at block 423, that the detected passcodes and/or password gesture patterns are the same as the previously-used passcodes and/or password gesture patterns, processing may proceed to block 430.

At block 430 (Disable Automatic Log-in Function of Application), end device 110 and/or operating system 220 may disable an automatic log-in function of at least one application hosted on end device 110.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
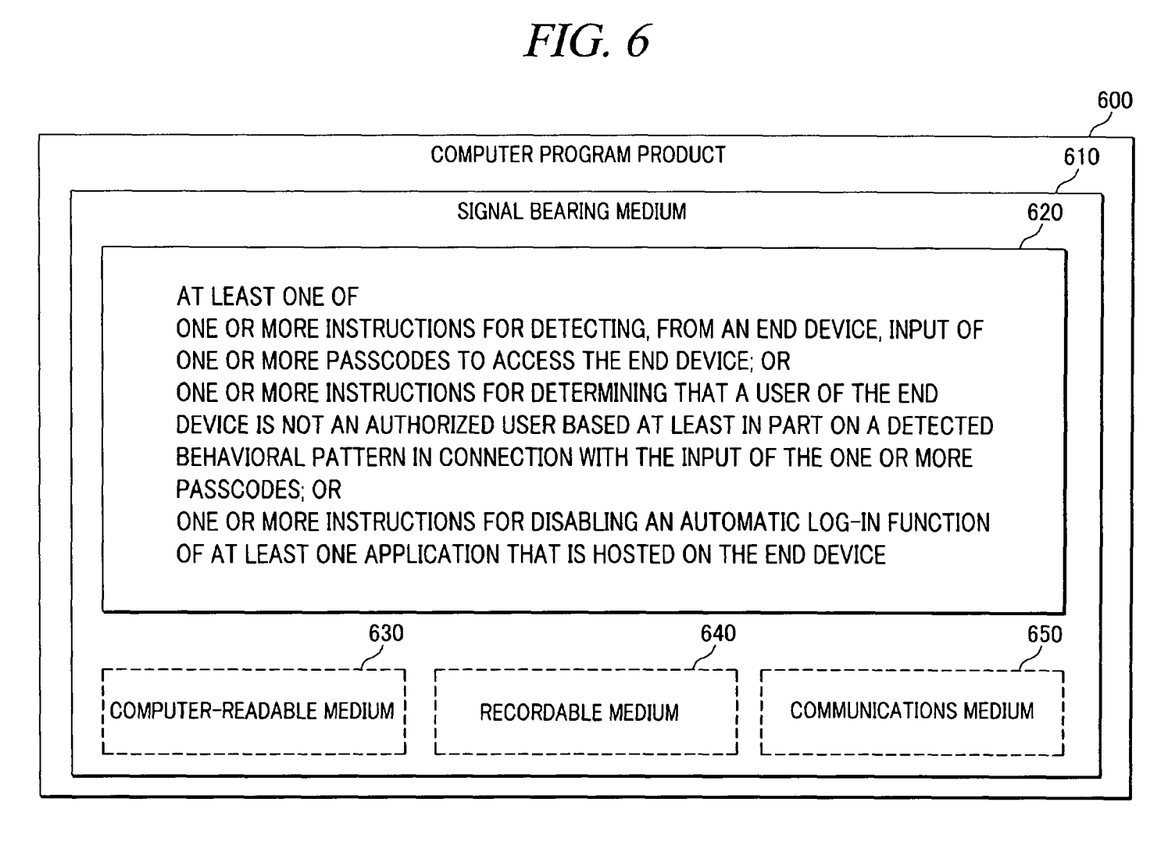
FIG. 6 illustrates computer program product that may be utilized to implement an automatic log-in function control scheme, arranged in accordance with at least some embodiments described herein.

FIG. 6 illustrates computer program product 600 that may be utilized to implement an automatic log-in function control scheme, arranged in accordance with at least some embodiments described herein.

Computer program product 600 may be hosted by an end device, such as end device 110. As depicted in FIG. 6, computer program product 600 may include a signal bearing medium 610. Signal bearing medium 610 may include one or more instructions 620 that, when executed by, for example, a processor, may provide the functionality described above with respect to FIGS. 1-5. By way of example, but not limitation, instructions 620 may include: one or more instructions for detecting, from an end device, input of one or more passcodes to access the end device; one or more instructions for determining that a user of the end device is not an authorized user based at least in part on a detected behavioral pattern in connection with the input of the one or more passcodes; one or more instructions for disabling an automatic log-in function of at least one application that is hosted on the end device. Thus, for example, referring to FIGS. 1-5, end device 110 and/or operating system 220 may undertake one or more of the blocks shown in FIGS. 4-5 in response to instructions 620.

In some implementations, signal bearing medium 610 may encompass a computer-readable medium 630, such as, but not limited to, a hard disk drive (HDD), a compact disc (CD), a digital versatile disk (DVD), a digital tape, memory, etc. In some implementations, signal bearing medium 610 may encompass a recordable medium 640, such as, but not limited to, memory, read/write (R/W) CDs, R/W DVDs, etc. In some implementations, signal bearing medium 610 may encompass a communications medium 650, such as, but not limited to, a digital and/or an analog communication medium (e.g., a fiber optic cable, a waveguide, a wired communication link, a wireless communication link, etc.). Thus, for example, computer program product 600 may be conveyed to one or more modules of end device 110 by an RF signal bearing medium 620, where the signal bearing medium 620 is conveyed by a wireless communications medium 650 (e.g., a wireless communications medium conforming with the IEEE 802.11 standard).

Figure 7:
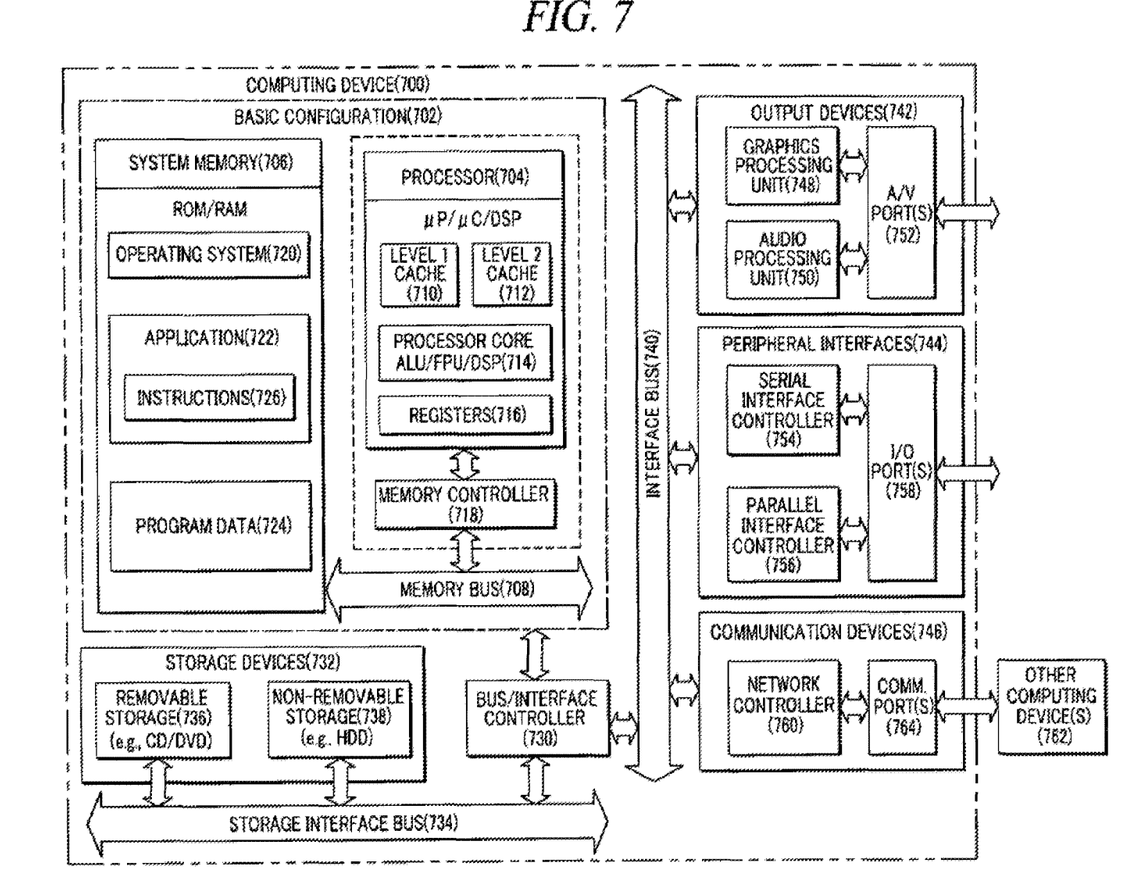
FIG. 7 is a block diagram illustrating an example computing device that may be utilized to implement an automatic log-in function control scheme, arranged in accordance with at least some embodiments described herein.

FIG. 7 is a block diagram illustrating an example computing device that may be utilized to implement an automatic log-in function control scheme, arranged in accordance with at least some embodiments described herein. In these examples, elements of computing device 700 may be arranged or configured for a device. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP core), or any combination thereof. An example memory controller 718 may also be used with processor 704, or in some implementations, memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, an application 722, and program data 724. Application 722 may include instructions 726 that may be arranged to perform the functions as described herein including the actions described with respect to end device architecture as shown in FIG. 2 or including the actions described with respect to the flow charts shown in FIG. 5. In some examples, application 722 may be arranged to operate with program data 724 on an operating system 720 such that the automatic log-in function control scheme as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an end device, the method comprising:
    detecting input of two or more passcodes to access the end device;
    determining whether a user of the end device is or is not an authorized user based at least, in part, on a detected behavioral pattern in connection with the input of the two or more passcodes, wherein the detected behavioral pattern is associated with the input of the two or more passcodes, wherein the two or more passcodes comprise at least one invalid passcode and a currently valid passcode, wherein the determining whether the user of the end device is or is not the authorized user comprises comparing the at least one invalid passcode as input with the currently valid passcode as input, and wherein the determining whether the user of the end device is or is not the authorized user comprises determining that the user of the end device is not the authorized user when at least one of the two or more passcodes is detected to be randomly-generated; and
    responsive to the determination that the user of the end device is not the authorized user, the end device instructing at least one application, which is hosted on the end device, to disable an automatic log-in function of the at least one application.

2. The method of claim 1, wherein the determining includes:
    determining that the user of the end device is not the authorized user when at least one of the two or more passcodes is detected to be similar to a currently-used passcode for access to the end device.

3. The method of claim 2, wherein the at least one of the two or more passcodes is detected to be similar to the currently-used passcode, for the access to the end device when a portion of digits included in the at least one of the two or more passcodes is different from digits included in the currently-used passcode.

4. The method of claim 1, wherein the determining includes:
    determining that the user of the end device is not the authorized user when at least one of the two or more passcodes is detected to be same as a previously-used passcode for access to the end device.

5. The method of claim 1, wherein the instructing is implemented by an operating system of the end device.

6. The method of claim 1, wherein the instructing at least one application to disable the automatic log-in function is performed when the at least one application is activated on the end device.

7. The method of claim 1, wherein the instructing at least one application to disable the automatic log-in function is performed based at least, in part, on a particular protocol between the at least one application and an operating system of the end device.

8. The method of claim 1, wherein the instructing includes sending, to the at least one application, a notification that the user of the end device is not the authorized user, and
wherein the at least one application disables the automatic log-in function of the at least one application, in response to receipt of the notification.

9. The method of claim 1, wherein the at least one of the two or more passcodes is detected to be randomly generated when all digits included in the at least one of the two or more passcodes are different from one input passcode to a next input passcode.

10. An end device, comprising:
a processor;
an internal memory;
an input unit, stored in the internal memory, that, in response to execution, causes the processor to detect, from the end device, input of two or more passcodes to access the end device; and
an operating system, stored in the internal memory, that, in response to execution, causes the processor to perform operations including:
determine whether a user of the end device is or is not an authorized user based at least, in part, on a detected behavioral pattern in connection with the input of the two or more passcodes, wherein the detected behavioral pattern is associated with the input of the two or more passcodes, wherein the two or more passcodes comprise at least one invalid passcode and a currently valid passcode, wherein the determination of whether the user of the end device is or is not the authorized user comprises a comparison of the at least one invalid passcode as input with the currently valid passcode as input, and wherein the determination of whether the user of the end device is or is not the authorized user comprises a determination that the user of the end device is not the authorized user when at least one of the two or more passcodes is detected to be randomly-generated; and
responsive to the determination that the user of the end device is not the authorized user, instruct at least one application that is hosted on the end device to disable an automatic log-in function of the at least one application.

11. The end device of claim 10, wherein the determination of whether the user of the end device is or is not the authorized user includes:
determination that the user of the end device is not the authorized user when at least one of the two or more passcodes is detected to be similar to a currently-used passcode for access to the end device.

12. The end device of claim 10, wherein the determination of whether the user of the end device is or is not the authorized user includes:
a determination that the user of the end device is not the authorized user when at least one of the two or more passcodes is detected to be same as a previously-used passcode for access to the end device.

13. The end device of claim 10, wherein the instruction to the at least one application to disable the automatic log-in function is performed when the at least one application is activated on the end device.

14. A non-transitory computer-readable storage medium having stored thereon computer-executable instructions that, in response to execution, cause an operating system that is stored in an end device to perform operations, comprising:
detect input of two or more passcodes to access the end device;
determine whether a user of the end device is or is not an authorized user based at least, in part, on a detected behavioral pattern in connection with the input of the two or more passcodes, wherein the detected behavioral pattern is associated with the input of the two or more passcodes, wherein the two or more passcodes comprise at least one invalid passcode and a currently valid passcode, wherein the determination of whether the user of the end device is or is not the authorized user comprises a comparison of the at least one invalid passcode as input with the currently valid passcode as input, and wherein the determination of whether the user of the end device is or is not the authorized user comprises a determination that the user of the end device is not the authorized user when at least one of the two or more passcodes is detected to be randomly-generated; and
responsive to the determination that the user of the end device is not the authorized user, instruct at least one application, hosted on the end device, to disable an automatic log-in function of the at least one application.

* * * * *

UNITED STATES PATENT AND TRADEMARK OFFICE
CERTIFICATE OF CORRECTION

PATENT NO. : 9,830,437 B2  
APPLICATION NO. : 14/377410  
DATED : November 28, 2017  
INVENTOR(S) : Kim Page 1 of 1

It is certified that error appears in the above-identified patent and that said Letters Patent is hereby corrected as shown below:

On the Title Page

Item (71), under "Applicant", in Column 1, Lines 1-2, delete "Empire Technology Development LLC, Wilmington (DE)" and insert -- Empire Technology Development LLC, Wilmington, DE (US) --, therefor.

In the Specification

In Column 10, Line 50, delete "disk (DVD)," and insert -- disc (DVD), --, therefor.

In the Claims

In Column 14, Lines 52-53, in Claim 3, delete "device when" and insert -- device, when --, therefor.

Signed and Sealed this  
Seventeenth Day of April, 2018

Andrei Iancu  
*Director of the United States Patent and Trademark Office*